US011720504B2

(12) United States Patent
Manepalli et al.

(10) Patent No.: US 11,720,504 B2
(45) Date of Patent: Aug. 8, 2023

(54) SECURE STORAGE OF DATASETS IN A THREAD NETWORK DEVICE

(71) Applicant: Apple Inc., Cupertino, CA (US)

(72) Inventors: Venkateswara Rao Manepalli, San Jose, CA (US); Amit Gulia, Cupertino, CA (US); Andrei Tudorancea, San Jose, CA (US); Dominic Spill, Cupertino, CA (US); Jesus A. Gutierrez Gomez, Sunnyvale, CA (US); Kahraman D. Akdemir, Santa Clara, CA (US); Aaron M. Sigel, Cupertino, CA (US); William K. Estes, Cupertino, CA (US); Kyle C. Brogle, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 42 days.

(21) Appl. No.: 17/231,635

(22) Filed: Apr. 15, 2021

(65) Prior Publication Data
US 2022/0334980 A1   Oct. 20, 2022

(51) Int. Cl.
*G06F 12/14* (2006.01)
*G06F 21/79* (2013.01)
(Continued)

(52) U.S. Cl.
CPC ........ *G06F 12/1491* (2013.01); *G06F 12/145* (2013.01); *G06F 21/79* (2013.01);
(Continued)

(58) Field of Classification Search
CPC .... G06F 12/1491; G06F 12/145; G06F 21/79; G06F 2212/1052; G06F 2212/154; H04L 41/12
(Continued)

(56) References Cited

U.S. PATENT DOCUMENTS 5,448,718 A * 9/1995 Cohn .................. G06F 11/1466
710/240
8,601,587 B1 * 12/2013 Powell ................ G06F 21/552
726/25

(Continued)

FOREIGN PATENT DOCUMENTS

WO   WO-2005112395 A1 * 11/2005   ............ H04L 49/90
WO   WO-2013131440 A1 *  9/2013   ............ H04L 43/08
(Continued)

*Primary Examiner* — David R Lazaro
*Assistant Examiner* — Berhanu Shitayewoldetadik
(74) *Attorney, Agent, or Firm* — Sterne, Kessler, Goldstein & Fox P.L.L.C.

(57) ABSTRACT

Some aspects of this disclosure relate to implementing a thread device that can associate with a thread network. The thread device includes a network processor, a first memory, and a host processor communicatively coupled to the network processor and the first memory. The first memory can be a nonvolatile memory with a first level security protection, and configured to store a first dataset including thread network parameters for the network processor to manage network functions for the thread device associated with the thread network. The network processor can be coupled to a second memory to store a second dataset having a same content as the first dataset. The network processor is configured to manage the network functions based on the second dataset. The second memory can be a volatile memory with a second level security protection that is less than the first level security protection.

20 Claims, 7 Drawing Sheets

(51) Int. Cl.
*H04L 12/24* (2006.01)
*H04L 15/16* (2006.01)
*G06F 21/00* (2013.01)
*G06F 21/44* (2013.01)
*G06F 9/455* (2018.01)
*H04L 29/06* (2006.01)
*G06F 13/38* (2006.01)
*H04L 9/08* (2006.01)
*H04L 41/12* (2022.01)

(52) U.S. Cl.
CPC ...... *H04L 41/12* (2013.01); *G06F 2212/1052* (2013.01); *G06F 2212/154* (2013.01)

(58) Field of Classification Search
USPC .......................................................... 709/220
See application file for complete search history.

(56) References Cited

U.S. PATENT DOCUMENTS

| | | | | |
|---|---|---|---|---|
| 2003/0204273 | A1* | 10/2003 | Dinker | H04L 41/12 |
| | | | | 706/15 |
| 2003/0204786 | A1* | 10/2003 | Dinker | H04L 45/46 |
| | | | | 714/43 |
| 2004/0221049 | A1* | 11/2004 | Blumenau | H04L 63/101 |
| | | | | 707/999.1 |
| 2004/0236874 | A1* | 11/2004 | Largman | G06F 21/71 |
| | | | | 710/8 |
| 2008/0244211 | A1* | 10/2008 | Ito | G06F 21/79 |
| | | | | 711/E12.003 |
| 2011/0320689 | A1* | 12/2011 | Cho | G06F 12/0246 |
| | | | | 711/E12.008 |
| 2012/0269096 | A1* | 10/2012 | Roskind | H04L 67/1061 |
| | | | | 370/255 |
| 2012/0294275 | A1* | 11/2012 | Krishnaswamy | H04W 36/0055 |
| | | | | 370/331 |
| 2013/0046830 | A1* | 2/2013 | MacDonald | H04L 51/216 |
| | | | | 709/206 |
| 2014/0068277 | A1* | 3/2014 | Metzger | G06F 21/79 |
| | | | | 713/193 |
| 2014/0122821 | A1* | 5/2014 | Park | G06F 3/0652 |
| | | | | 711/166 |
| 2014/0164610 | A1* | 6/2014 | Roskind | H04L 43/10 |
| | | | | 709/224 |
| 2014/0351431 | A1* | 11/2014 | Li | H04L 43/08 |
| | | | | 709/224 |
| 2015/0154424 | A1* | 6/2015 | Mittal | G06F 21/78 |
| | | | | 713/192 |
| 2015/0199298 | A1* | 7/2015 | Strong | H04L 67/1097 |
| | | | | 709/216 |
| 2016/0226761 | A1* | 8/2016 | Hui | H04L 45/74 |
| 2017/0068477 | A1* | 3/2017 | Yu | G06F 3/0623 |
| 2017/0220487 | A1* | 8/2017 | Jung | G06F 12/1408 |
| 2018/0081583 | A1* | 3/2018 | Breternitz | G06F 12/00 |
| 2018/0285734 | A1* | 10/2018 | Chen | G06N 3/063 |
| 2018/0299841 | A1* | 10/2018 | Appu | G05D 1/0088 |
| 2018/0309789 | A1* | 10/2018 | Johnson | H04L 41/0893 |
| 2018/0314932 | A1* | 11/2018 | Schwartz | G06F 7/60 |
| 2018/0314934 | A1* | 11/2018 | Ben-Avi | G06N 3/084 |
| 2019/0245853 | A1* | 8/2019 | Shaw | G06F 12/1408 |
| 2020/0026575 | A1* | 1/2020 | Guim Bernat | G06F 9/5072 |
| 2020/0177638 | A1* | 6/2020 | Salman | H04L 43/50 |
| 2020/0210472 | A1* | 7/2020 | Das | G06F 16/784 |
| 2021/0216628 | A1* | 7/2021 | Kutner | G06F 3/0673 |

FOREIGN PATENT DOCUMENTS

| | | | | |
|---|---|---|---|---|
| WO | WO-2016023442 | A1 * | 2/2016 | ........... H04W 24/08 |
| WO | WO-2017014922 | A1 * | 1/2017 | ........... H04L 45/122 |

\* cited by examiner

SECURE STORAGE OF DATASETS IN A THREAD NETWORK DEVICE

BACKGROUND

Field

The described aspects generally relate to secure storage of datasets in a thread network device.

Related Art

Wireless communication networks avoid the costly process of introducing cables into buildings as connections between different equipment locations. The basis of wireless systems are radio waves, an implementation that takes place at the physical level of network structure. There are many kinds of wireless communication networks, e.g., wireless Local Area Networks (LAN), wireless Metropolitan Area Networks (MAN), wireless Wide Area Networks (WAN), wireless Personal Area Networks (PAN), wireless sensor networks, satellite communication networks, or thread networks.

The Internet of Things (IoT) aims to transform everyday life through smart homes and businesses. In the home, IoT is a network of connected appliances, lights, climate control, security, and entertainment systems, all of which work together to make life more convenient and rewarding for consumers. IoT devices can form thread networks for simplicity, security, reliability, and efficiency. However, there are security challenges for thread network devices.

SUMMARY

Some aspects of this disclosure relate to apparatuses and methods for implementing thread networks, which is an internet based, e.g., IPv6-based, low-power mesh networking technology for Internet of Things (IoT) devices. Some aspects of this disclosure relate to apparatuses and methods for thread network of other similar devices, or other similar networks as well.

Some aspects of this disclosure relate to a device of a thread network, where the device can include a thread network apparatus. The device can be a full thread device (leader, router, border router, a router eligible end device, a full end device) or a minimal thread device (a minimal end device, a sleepy end device). The thread network can be identified by a 2-byte personal area network ID (PAN ID), an 8-byte extended personal area network ID (XPAN ID), and a network name.

According to some aspects, the thread network apparatus includes a transceiver configured to transmit and receive communication signals over a thread network. The thread network apparatus further includes a network processor communicatively coupled to the transceiver, a first memory, and a host processor communicatively coupled to the network processor and the first memory. The first memory can be a persistent or nonvolatile storage device or memory with a first level security protection. The first memory is configured to store a dataset including thread network parameters associated with the network functions. The host processor is configured to perform various operations. For example, the host processor can be configured to store the dataset into the first memory, delete the dataset from the first memory, read the dataset from the first memory, or some other storage related functions.

According to some aspects, the network functions managed by the network processor includes network functions above a Medium Access Control (MAC) layer function and below an application layer function in a communication protocol stack for the thread network. The MAC layer function can include a personal network MAC layer function, an IEEE 802.15.4 MAC layer function, a ZigBee MAC layer function, a Z-Wave MAC layer function, a Bluetooth Low Energy (LE) MAC layer function, or other MAC layer functions.

According to some aspects, the dataset can include an active operational dataset, a pending operational dataset, an active timestamp, a pending timestamp, a master key, a network name, a personal area network ID (PANID), an extended personal area network ID (XPANID), a mesh local prefix, a delay, a channel, a portable symmetric key container (PSKC), a security policy, a channel mask, or other parameters.

According to some aspects, the dataset stored in the first memory is a first dataset. The network processor can be communicatively coupled to a second memory to store a second dataset, where the second dataset has a same content as the first dataset. The network processor is configured to manage the network functions based on the second dataset. The second memory can be a volatile memory with a second level security protection that is less than the first level security protection.

According to some aspects, the network processor can be configured to receive a dataset from the thread network or from the host processor; store the received dataset in the second memory to be the second dataset, where the first and the second datasets can be different copies of the same dataset; send the received dataset from the thread network to the host processor; receive one or more instructions from the host processor to perform operations associated with the thread network; perform a reset operation of the network processor; send a request to the host processor for the first dataset stored in the first memory; detect a state among a set of states the network processor operates in; or some other operations related to the thread network.

According to some aspects, the host processor can be further configured to send the first dataset stored in the first memory to the network processor; receive a dataset from the network processor and store the received dataset in the first memory to become the first dataset; instruct the network processor to perform an operation to Join, Leave, or Form the thread network; inquire the state of the network processor; perform a reset operation of the network processor; or some other operations related to the thread network.

According to some aspects, the network processor can be configured to operate in a state selected from a set of states to manage the network functions. The set of states the network processor operates includes a waiting state, a forming a network state, a joining state, an update state, a leaving state, a reset state, an associated state, a start state, and some other states.

According to some aspects, the network processor is in an update state and configured to receive, from one or more devices of the thread network, an updated dataset that contains updated information for the second dataset stored in the second memory; store the updated dataset in the second memory; and send, to the host processor, the updated dataset. On the other hand, the host processor is configured to receive the updated dataset from the network processor; store the updated dataset into the first memory; and delete the first dataset already stored in the first memory.

According to some aspects, the network processor is in a forming a network state or a joining state. The host processor is configured to delete the first dataset from the first memory; and instruct the network processor to perform operations to Join or Form the thread network. The network processor is configured to join or form the thread network; receive a dataset from a leader or from a router of the thread network, where the dataset is propagated from the leader to the router through one or more routers or router-eligible devices; store the received dataset in the second memory to be the second dataset; and send the received dataset to the host processor to be stored in the first memory.

According to some aspects, the network processor is in a leaving state. The host processor is configured to delete the first dataset from the first memory; and instruct the network processor to perform operations to leave the thread network. The network processor is configured to perform operations to Leave the thread network.

According to some aspects, the network processor is in a reset state. The host processor is configured to receive a request from the network processor for the first dataset; read the first dataset from the first memory; and send the first dataset to the network processor. There can be other ways to implement the operations. For example, the host processor can send the first dataset (if present) as a part of the network processor initialization process after the network processor is reset. On the other hand, the network processor is configured to send the request to the host processor for the first dataset; receive a copy of the first dataset from the host processor; store the copy of the first dataset in the second memory to become the second dataset; and perform operations to reset the network processor.

According to some aspects, the host processor can be configured to perform a reset operation of the network processor; and inquire the state of the network processor. When the network processor is in an associated state indicating there is a connection between the network processor and the thread network, the host processor is configured to receive a copy of the second dataset from the network processor. Alternatively, when the network processor is not in an associated state, the host processor is configured to read the first dataset from the first memory, and send the first dataset to the network processor.

According to some aspects, the device can further include a third memory that is a nonvolatile memory coupled to the network processor, and the third memory stores data about a role, a device mode, a routing locator (RLOC), a key sequence number, a mesh link establishment (MLE) frame counter, a MAC frame counter, a previous partition ID, an extended address, a default interface identifier (IID), a mesh-local endpoint identifier (ML-EID), a stateless address autoconfiguration (SLAAC) default interface identifier (IID), a secret key, a child information, a parent information, or a network information.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1A:
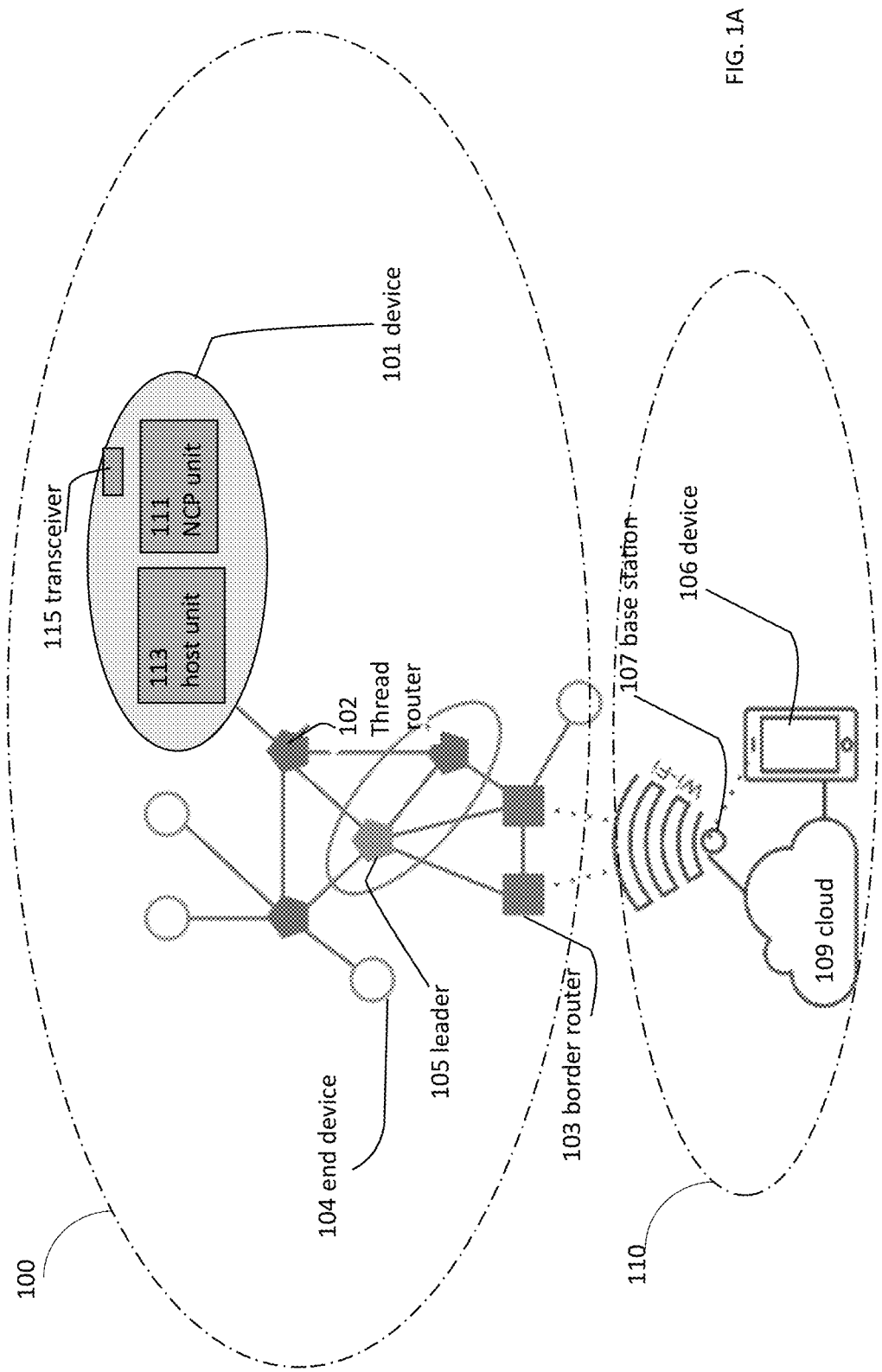
FIGS. 1A-1B illustrate an example thread network including various devices having a network processor, a host processor, and a secure storage memory coupled to the host processor, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

The Internet of Things (IoT) can transform everyday life for homes and businesses. IoT devices can form a thread network designed for low-power IoT devices. A device in a thread network can be referred to as a "thread device", which is used interchangeably with a "thread network device", "wireless device", or a "device" in the present disclosure. A thread network can be built on some wireless personal area network (WPAN) technologies, operating according to a corresponding wireless standard, e.g., IEEE 802.15.4 standard based wireless mesh network. A thread network can include various application-layer agnostic network functions above a Medium Access Control (MAC) layer function and below an application layer function in a communication protocol stack for the thread network. For example, a thread network can include a network and transport level stack, such as an internet protocol (IP), e.g., IPv6, and user datagram protocol (UDP) transport layer.

A thread network has many advantages, e.g., secure, based on wireless mesh networking protocol, with direct device addressability and point-to-point device connectivity that has no single point of failure. A thread network can support low power, sleep-capable or sleepy devices. A thread network can be setup in a user-friendly manner with low cost bridging to other IP networks. Furthermore, a thread network can be built upon some existing IEEE and Internet Engineering Task Force (IETF) standards, with some available open source thread stack.

A thread device can include a network processor to manage network functions for the device associated with the thread network, and a host processor communicatively coupled to the network processor. A network processor can be referred to as a network co-processor. The network processor can manage network functions based on some datasets. For example, an active operational dataset or a pending operational dataset containing security sensitive information, e.g., master key, portable symmetric key container (PSKC) key, or security policies, can be used by the network processor to implement network functions including wireless transmission and reception. In some thread device, the active and pending datasets of the device are stored in a persistent flash memory coupled to the network processor. Hence, such active and pending datasets can still be available when the network processor is not operational and disconnected from the thread network. Since the active and pending datasets are related to the thread network, such datasets obtained from a non-operational device in the thread network, in an unauthorized way, can be used in another device that is operational. Hence, storing these security sensitive datasets in the persistent flash memory coupled to the network processor poses a security risk for the thread network. Encryption can be applied to the active and pending datasets of the device stored in the persistent flash memory coupled to the network processor. However, the security provided by such encryption may still not be enough. In addition, since the network processor needs to access the active and pending datasets of the device during operations, over protected active and pending datasets accessed by the network processor can increase the operational complexity for the network processor, requiring more power consumption by the thread device.

According to some aspects, a device of a thread network can include a secure storage memory communicatively coupled to the host processor of the device. The secure storage memory can be referred to as a first memory with a first level security protection. The secure storage memory can be a persistent or nonvolatile storage memory, and can store the active and pending datasets of the device as a first dataset in a secure manner, e.g., encrypted and managed by security management software. For example, the first dataset can be stored in the secure storage memory based on the Keychain® technology. The host processor can operate a network interface driver to perform secure operations related to the first dataset stored in the secure storage memory. For example, the network interface driver can store the first dataset into the secure storage memory, delete the first dataset from the secure storage memory, or read the first dataset from the secure storage memory. Furthermore, the host processor can operate a network processor manager to manage communication with the network processor. Additionally, the network processor is communicatively coupled to a volatile storage memory that store a second dataset having same content as the first dataset. The volatile storage memory coupled to the network processor can be referred to as a second memory with a second level security protection, where the second level security protection is less than the first level security protection. The network processor can manage the network functions based on the second dataset. In some embodiments, to increase the efficiency, the second dataset can be without encryption or with less security protection relative to that applied to the first dataset in the secure storage memory. Based on the second dataset, the network processor can operate in a state selected from a set of states to manage network functions for the device associated with the thread network.

Accordingly, the second dataset stored in the volatile storage memory coupled to the network processor can provide the network processor with the needed dataset with improved operational efficiency. Whereas, the first dataset stored in the persistent or nonvolatile secure storage memory coupled to the host processor can provide added security for the dataset. In addition, operational procedures are disclosed so that the host processor and the network processor can maintain the consistency of the first dataset and the second dataset to have the same content.

Figure 1B:
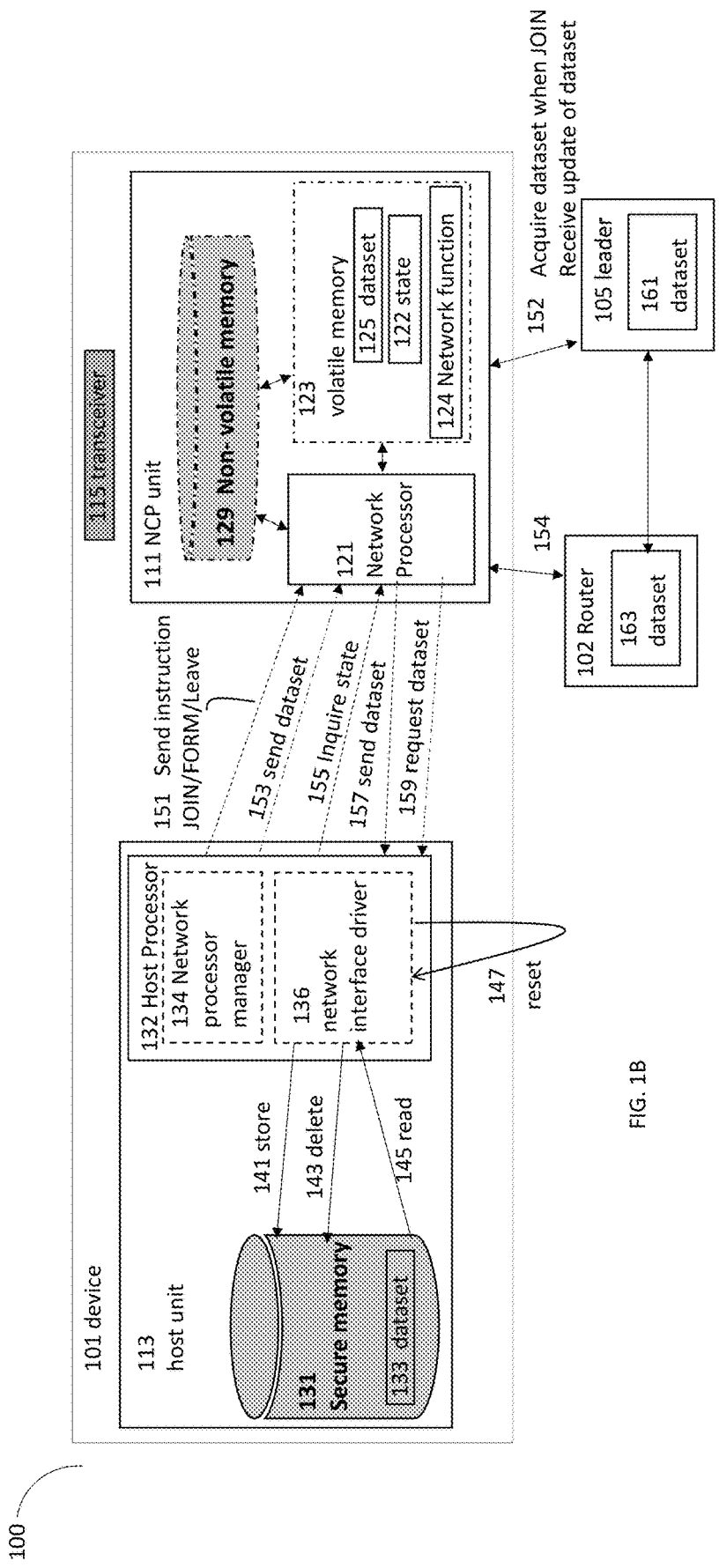

FIGS. 1A-1B illustrate an example thread network 100 including various devices having a network processor, a host processor, and a secure storage memory coupled to the host processor, according to some aspects of the disclosure. Thread network 100 is provided for the purpose of illustration only and does not limit the disclosed aspects. Thread network 100 can include, but is not limited to, multiple devices, e.g., a device 101, a device 102, a device 103, a device 104, and a device 105. Thread network 100 can be communicatively coupled to a base station 107 for wireless communication. Base station 107 can be an access point or a router for another wireless network 110 that includes a device 106. In addition, base station 107 can be coupled to a cloud computing system 109 that is connected to the Internet.

According to some aspects, wireless network 110 includes base station 107 and device 106. Base station 107 can communicate via a wired or wireless communication channel with one or more other electronic devices (not shown) and/or another network, such as the Internet. Wireless network 110 can be configured to operate according to any of various communications standards, such as the various IEEE 802.11 standards or protocols, e.g., 802.11a, b, g, n, ac, and ax, or 802.15.4. Base station 107 can be a Wi-Fi access point, or additionally or alternatively, be configured to communicate via various other wireless communication technologies, including, but not limited to, a wireless communication system based on 3rd Generation Partnership Project (3GPP) release 16 (Rel-16), release 17 (Rel-17), a New Radio (NR) wireless systems, or any other wireless technology.

According to some aspects, devices 101-106 can be a mobile phone, a cellular telephone, a smart phone, a laptop, a desktop, a tablet, a personal assistant, a monitor, a television, a wearable device, an IoT device, a fan, a thermostat, a lightbulb, a sensor, a streetlight, a toy, a vehicle's communication device, a mobile station, a subscriber station, a remote terminal, a wireless terminal, a user device, a mobile or portable Global Positioning System (GPS) device, a digital video broadcast (DVB) device, a sensor device, an on-board device, an off-board device, a consumer device, a vehicular device, a video device, an audio device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a digital video camera (DVC), a digital audio player, a speaker, an audio receiver, an audio amplifier, a gaming device, a media player, or the like.

According to some aspects, thread network 100 including devices 101-105 can be identified by a 2-byte personal area network ID (PANID), an 8-byte extended personal area network ID (XPANID), a network name, or any other identification. Devices 101-105 can communicate on a single channel within thread network 100.

According to some aspects, devices 101-105 play different roles in thread network 100. Device 104 is an end device, while device 102, device 103, and device 105 are routers. An end device, e.g., device 104, can communicate primarily with a single router, which is a parent device of the end device, while the end device is a child device of the parent device. A router, e.g., device 102, device 103, or device 105, can forward packets for network devices, provide secure commissioning services for devices trying to join the network. A router can further have a parent router as well. A router keeps its transceiver enabled at all times. A router can be referred to as a full thread device. On the other hand, an end device does not forward packets for other network devices. An end device can disable its transceiver to reduce power.

According to some aspects, an end device, e.g., device 104, can be classified into different categories, e.g., a router eligible end device, a full end device, a minimal end device, or a sleepy end device. A router eligible end device or a full end device can also be referred to as a full thread device. A router eligible end device or a full end device always has its radio on, and can subscribe to multicast traffic. A router eligible end device can be promoted to a router, while a full end device cannot be promoted to a router. A minimal end device or a sleepy end device, which may be called minimal thread device, does not subscribe to multicast traffic. A minimal thread device forwards all messages to its parent device. For a minimal end device, its transceiver is always on. Therefore, a parent device of a minimal end device does not need to poll for messages. Whereas, a sleepy end device has its radio or transceiver normally disabled, and only wakes up occasionally. Therefore, the sleepy end device can poll the parent device for messages on waking up.

A router, e.g., device 102, device 103, or device 105, can be further classified as a leader, a thread router, or a border router. For example, device 102 is a thread router, device 103 is a border router, and device 105 is a leader. A leader, e.g., device 105, is responsible for managing the set of routers. A leader can be dynamically self-elected for fault tolerance, and aggregates and distributes network-wide configuration information, e.g., an active operational dataset or a pending operational dataset. A border router, e.g., device 103, can forward information between a thread network and a non-thread network, e.g., forwarding information between network 100 and network 110.

According to some aspects, device 101 can be a router, an end device, a router eligible end device, a full end device, a minimal end device, a minimal thread device, a sleepy end device, a leader, or a border router.

As shown in FIG. 1B, device 101 includes a transceiver 115 configured to wirelessly communicate with one or more devices of thread network 100, a network processor unit 111 communicatively coupled to transceiver 115, and a host processor unit 113 communicatively coupled to transceiver 115 and network processor unit 111. Host processor unit 113 can include a secure storage memory 131 and a host processor 132. Secure storage memory 131 can be a persistent or nonvolatile storage device. Secure storage memory 131 can store a dataset 133 comprising thread network parameters for the network processor to manage the network functions. Dataset 133 can contain security sensitive information. Host processor 132 can operate a network interface driver 136 and a network processor manager 134.

According to some aspects, network processor unit 111 includes a network processor 121, a volatile storage memory 123, e.g., memory, coupled to network processor 121, and a persistent or nonvolatile storage memory 129. Volatile storage memory 123 can store a dataset 125, and a set of states 122 for network processor 121. Dataset 125 can have a same content as dataset 133 stored in secure storage memory 131. In addition, persistent or nonvolatile storage memory 129 can store some other data, e.g., less security sensitive data than dataset 125. Further, network processor 121 can be configured to perform various network functions 124. Network processor 121 can be configured to operate in a state selected from the set of states 122 to manage network functions 124 for device 101 associated with thread network 100.

In some embodiments, network functions 124 managed by network processor 121 can include network functions above a Medium Access Control (MAC) layer function and below an application layer function in a communication protocol stack for the thread network. The MAC layer function includes a personal network MAC layer function, an IEEE 802.15.4 MAC layer function, a ZigBee MAC layer function, a Z-Wave MAC layer function, a Bluetooth Low Energy (LE) MAC layer function, or any other MAC layer function.

In some embodiments, persistent or nonvolatile storage memory 129 can store data with less security sensitivity, e.g., a role, a device mode, a routing locator (RLOC), a key sequence number, a mesh link establishment (MLE) frame counter, a MAC frame counter, a previous partition ID, an extended address, a default interface identifier (IID), a mesh-local endpoint identifier (ML-EID), a stateless address autoconfiguration (SLAAC) default interface identifier (IID), a secret key, a child information, a parent information, or a network information.

In some embodiments, dataset 133 and dataset 125 can include an active operational dataset, a pending operational dataset, an active timestamp, a pending timestamp, a master key, a network name, a personal area network ID (PANID), an extended personal area network ID (XPANID), a mesh local prefix, a delay, a channel, a portable symmetric key container (PSKC), a security policy, or a channel mask. In some embodiments, dataset 133 and dataset 125 can include an active operational dataset, a pending operational dataset, which can be propagated from a leader of thread network 100. For example, a leader, e.g., device 105, can propagate its operational datasets to all routers and router-eligible devices. Active and pending datasets are propagated to the end devices with network data only when it is known that an end device requests such datasets, based on the advertised timestamps. During the lifecycle of thread network 100, operational datasets can be updated.

According to some aspects, dataset 133 stored in secure storage memory 131 can be a first dataset, while dataset 125 stored in volatile storage memory 123 can be a second dataset. Dataset 133 stored in secure storage memory 131 can be protected by strong security mechanisms, e.g., a first level security protection, Keychain® technology. The second dataset has a same content as the first dataset, but may have different security protections, e.g., a second level security protection. Network processor 121 can be configured to manage network functions 124 based on dataset 125, the second dataset. Since network processor 121 needs to access dataset 125 for operational purpose, there may not be a strong secure protection, e.g., for dataset 125 to reduce the operational complexity for network processor 121. Therefore, dataset 125 and dataset 133 can have different security protection mechanism, so that operations depending on dataset 125 can be more efficient with less security protection, while dataset 133 stored in secure storage memory 131 can have more security protection than that of dataset 125. The second level security protection can be less than the first level security protection. For example, the second level security protection can have shorter length encryption keys or simpler security protocols, protecting fewer items by security protections. For example, operations related to dataset 133 can only be performed by network interface driver 136 in the host processor 132, hence network processor 121 cannot directly access dataset 133. The less secured dataset 125 will not be saved when network processor 121 is not operational since dataset 125 is stored in volatile storage memory 123 coupled to network processor 121. The use of dataset 133 and dataset 125 result in two advantages in that security protection is provided by host processor 132 and operation efficiency provided by network processor 121.

In some embodiments, as shown in FIG. 1B, host processor 132 can include a network interface driver 136. Network interface driver 136 can perform operation 141 to store a dataset into secure storage memory 131 to become dataset 133, perform operation 143 to delete dataset 133 from secure storage memory 131, perform operation 145 to read dataset 133 from secure storage memory 131, or perform operation 147 to reset network interface driver 136.

In some embodiments, host processor 132 can further perform operation 151 to instruct network processor 121 to perform an operation to Join, Leave, or Form thread network 100; perform operation 153 to send the first dataset, e.g., dataset 133, to network processor 121 after network interface driver 136 reads the first dataset from secure storage memory 131; perform operation 155 to inquire the state of network processor 121; perform operation 157 to receive a dataset from network processor 121 before network interface driver 136 stores the received dataset into secure storage memory 131 to become the first dataset, e.g., dataset 133; and perform operation 159 to receive a request from network processor 121 for the first dataset, e.g., dataset 133, from secure storage memory 131. The request can be any message or signal received from network processor 121. For example, when network processor 121 sends a message to host processor 132 to inform host processor 132 that network processor 121 has been reset, such a message informing host processor 132 can be interpreted by host processor 132 as a request message for the first dataset, e.g., dataset 133. There can be other operations performed by host processor 132, not shown in FIG. 1B.

In some embodiments, network processor 121 can further perform operation 153 to receive a dataset from host processor 132 or operation 152 to receive a dataset 163 from leader 105 or perform operation 154 to receive a dataset 161 from router 102. Operation 153 is a communication operation between network processor 121 and host processor 132, including operations performed by both network processor 121 and host processor 132. In addition, network processor 121 is further configured to perform operation to store the received dataset in volatile storage memory 123 to be the second dataset, e.g., dataset 125; perform operation 157 to send the received dataset from the thread network to host processor 132; perform operation 151 to receive one or more instructions from host processor 132 to perform operations associated with the thread network; perform operation 159 to send a request to host processor 132 for the first dataset, e.g., dataset 133, stored in secure storage memory 131. In addition, network processor 121 is further configured to perform a reset operation of network processor 121, or detect a state among the set of states 122 network processor 121 operates in.

Figure 2:
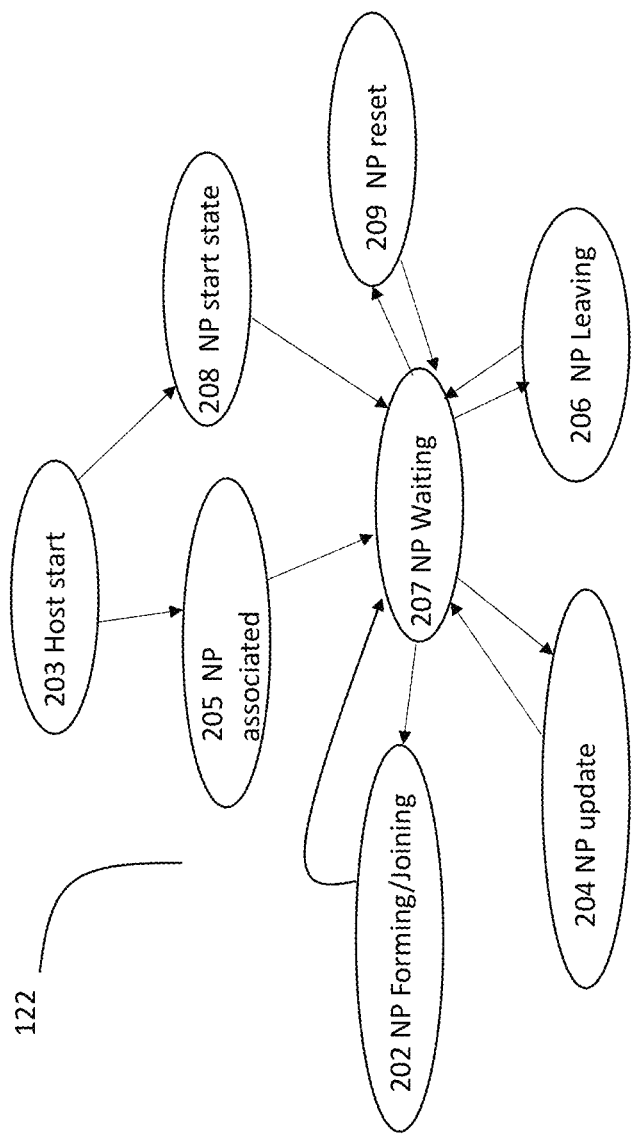
FIG. 2 illustrates example states of a network processor within a thread network device, according to some aspects of the disclosure.

In some embodiments, as shown in FIG. 2, host processor 132 and network processor 121 can operate in a state of the set of states 122. The set of states 122 can include a waiting state 207, a forming a network state 202, a joining state 202, an update state 204, a leaving state 206, a reset state 209, an associated state 205, and a start state 208. In addition, host processor 132 can be in various states, e.g., a start state 203. The number of states, or the kinds of state, included in the set of states 122 shown in FIG. 2 are only as an example and are not meant to be limiting. For example, as shown, forming a network and joining a network share a same state 202 because similar operations are performed in both states.

In some other embodiments, forming a network state 202 and joining state 202 can be represented by different states with different operations. There can be other states, e.g., default state, control state, low power state, not shown in FIG. 2.

In some embodiments, when host processor 132 starts up at start state 203, host processor 132 can start network processor 121 at start state 208. After both host processor 132 and network processor 121 have started, network processor 121 can enter waiting state 207 to wait for further events. Additionally and alternatively, if it is a restart, host processor 132 can test whether network processor 121 is in associated state 205 or not. Network processor 121 is in an associated state if there is an existing connection of network processor 121 with other devices of thread network 100. Otherwise, network processor 121 is not in an associated state. Afterwards, network processor 121 enters waiting state 207 to wait for further events.

In some embodiments, from waiting state 207, depending on received inputs, network processor 121 can enter many other states, e.g., forming a network state 202, joining state 202, update state 204, leaving state 206, or reset state 209. Furthermore, from any of those states, after performing the needed functions, network processor 121 can go back to waiting state 207. More detailed operations performed by network processor 121 at various states are shown in FIG. 3.

Figure 3:
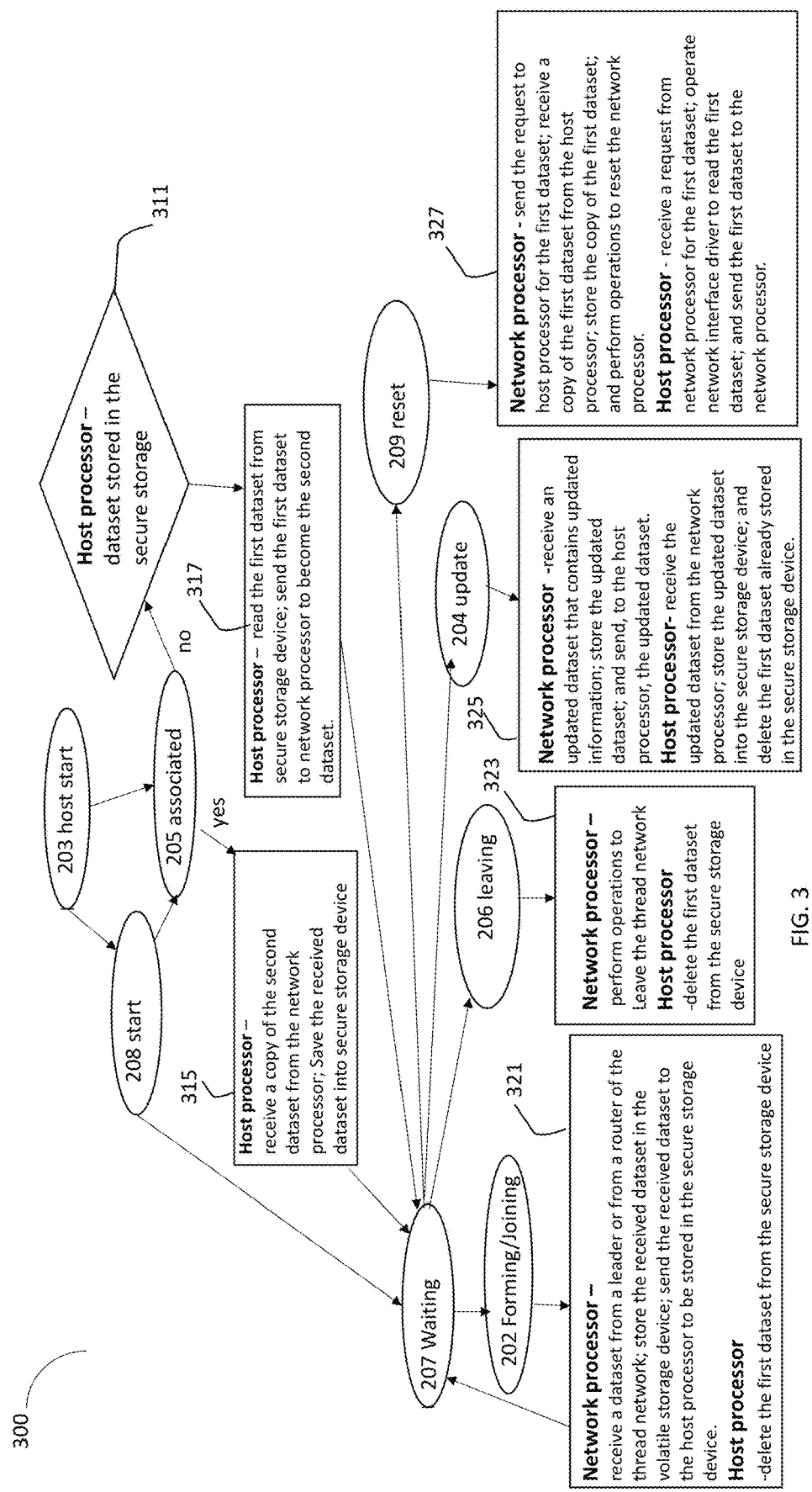
FIGS. 3-4 illustrate example methods performed by a network processor and a host processor of a device within a thread network, according to some aspects of the disclosure.

According to some aspects, FIG. 3 illustrates example operations of method 300 performed by network processor 121 and host processor 132 of device 101 within thread network 100, according to some aspects of the disclosure. Method 300 illustrates some detailed operations to be performed by network processor 121 and host processor 132 of device 101 when network processor 121 is in different states, e.g.: waiting state 207, forming a network/joining state 202, update state 204, leaving state 206, reset state 209, associated state 205, and start state 208, as shown in FIG. 2. Hence, FIG. 3 expands the state diagram of FIG. 2 with additional operations to be performed at each state. For convenience, not all operational details are shown in FIG. 3 for operations.

At 203, host processor 132 can start. Afterwards, at start state 208, network processor 121 can start, which can be triggered by host processor 132. Afterwards, network processor 121 can enter waiting state 207 to wait for further events.

Additionally and alternatively, when host processor 132 can restart at 203, host processor 132 can perform operations to inquire the state of the network processor 121. When the state of network processor 121 is in associated state 205, which indicates there is a connection between network processor 121 and thread network 100, host processor 132 performs operations 315, to receive a copy of the second dataset from network processor 121, and further operate network interface driver 136 to save the received dataset to secure storage memory 131 to become the first dataset. In the meantime, network processor 121 can enter waiting state 207 to wait for further events. For convenience of illustration, not all operational details are shown in FIG. 3 for operations 315, or some other operations, as will be understood by those skilled in the art.

When the state of network processor 121 is not an associated state, at 311, host processor 132 performs operations to test whether there is a dataset stored in secure storage memory 131. When there is a dataset stored in secure storage memory 131, at 317, host processor 132 operates network interface driver 136 to read the first dataset from secure storage memory 131, and send the first dataset to network processor 121 to become the second dataset. Network processor 121 can use the second dataset to join or start the thread network. At the meantime, network processor 121 can enter waiting state 207 to wait for further events. Furthermore, at 311, when there is no dataset stored in secure storage memory 131, host processor 132 may not perform any further operation, and network processor 121 can enter waiting state 207 to wait for further events, not shown.

From waiting state 207, network processor 121 can enter various operational state, e.g., forming a network/joining state 202, update state 204, leaving state 206, or reset state 209. Operations performed at each state are provide below. After the described operations are performed, network processor 121 goes back to waiting state 207.

At 202, when network processor 121 is in the forming a network state or the joining state, network processor 121 and host processor 132 can perform operations 321. In detail, host processor 132 operates network interface driver 136 to delete the first dataset from secure storage memory 131; and instructs network processor 121 to perform operations to Join or Form thread network 100, e.g. initiate a new thread network or join an existing thread network. Network processor 121 receives the instruction from host processor 132, joins or forms thread network 100; receives a dataset from a leader or from a router of the thread network 100; stores the received dataset in volatile storage memory 123 to be the second dataset; and sends the received dataset to host processor 132 to be stored in the secure storage memory 131.

At 206, when network processor 121 is in a leaving state to leave thread network 100, network processor 121 and host processor 132 can perform operations 323. In detail, host processor 132 operates network interface driver 136 to delete the first dataset from secure storage memory 131; and instructs network processor 121 to perform operations to Leave thread network 100. Network processor 121 then performs operations to Leave thread network 100.

At 204, when network processor 121 is in an update state to update the dataset, network processor 121 and host processor 132 can perform operations 325. In detail, network processor 121 receives, from one or more devices of thread network 100, an updated dataset that contains updated information for the second dataset stored in volatile storage memory 123; stores the updated dataset in volatile storage memory 123; and sends, to host processor 132, the updated dataset. Host processor 132 receives the updated dataset from network processor 121; and operates network interface driver 136 to store the updated dataset into secure storage memory 131; and deletes the first dataset already stored in secure storage memory 131.

At 209, when network processor 121 is in a reset state, network processor 121 and host processor 132 can perform operations 327. In detail, host processor 132 receives a request from network processor 121 for the first dataset; operates network interface driver 136 to read the first dataset from secure storage memory 131; and sends the first dataset to network processor 121. In some examples, the request can be a message received from network processor 121 to indicate that network processor 121 has been reset. Host processor 132 can take such a reset indication as a request message. Network processor 121 sends the request to host processor 132 for the first dataset; receives a copy of the first dataset from host processor 132; stores the copy of the first dataset in volatile storage memory 123 to become the second dataset; and performs operations to reset network processor 121.

Figure 4:
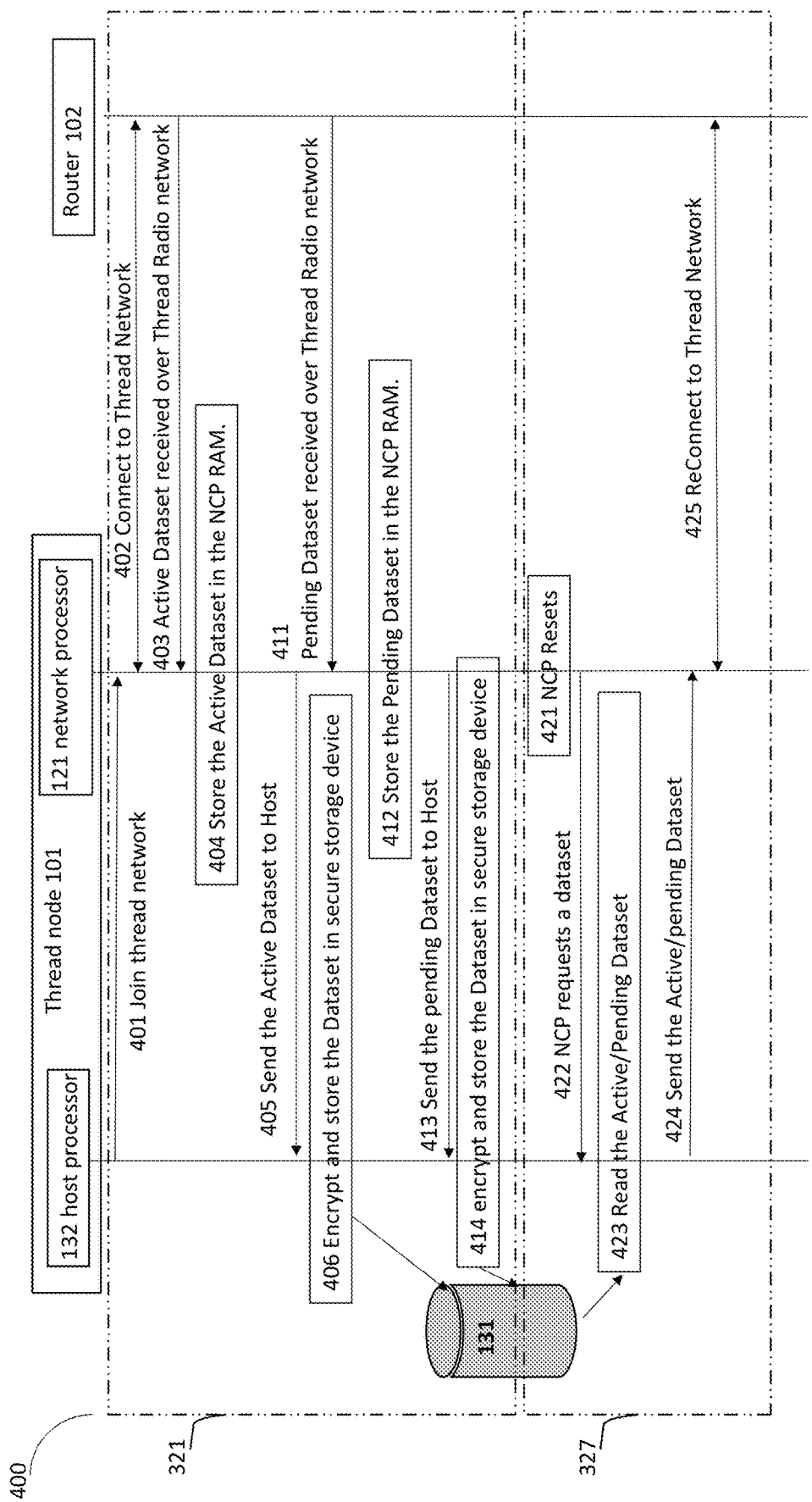

FIG. 4 provides more detailed description for two of such operations, operations 321 and operations 327 of FIG. 3 as an example. More detailed operations for other operations illustrated in FIG. 3 can be similarly developed by a person having ordinary skill of the arts.

According to some aspects, FIG. 4 illustrates example operations of method 400 performed by network processor 121 and host processor 132 of device 101 within thread network 100, according to some aspects of the disclosure. Method 400 illustrates some more details for operations 321 and operations 327 to be performed by network processor 121 and host processor 132 of device 101 when network processor 121 is in forming a network/joining state 202, or reset state 209, as shown in FIG. 2 or FIG. 3.

At 401, host processor 132 instructs network processor 121 to perform operations to join thread network 100. At 402, network processor 121 joins thread network 100, for example, network processor 121 can communicate with router 102 to join thread network 100. At 403, network processor 121 receives an active dataset from router 102. At 404, network processor 121 stores the active dataset in random-access memory (RAM), which is a volatile storage memory 123 attached to network processor 121. At 405, network processor 121 sends the received active dataset to host processor 132 to be stored in secure storage memory 131. At 406, host processor 132 stores the active dataset into secure storage memory 131. Operations at 401-406 are for an active dataset.

Operations similar to operations at 403-406 can be performed for a pending dataset. The pending datasets are used in the thread network whenever there is a change in a dataset network parameter which affects the ability for the neighboring devices to communicate, e.g., a change in a channel, a mesh local prefix, a network key, or a PAN ID. The pending dataset is distributed to all the nodes in the networks. After a scheduled time, these devices delete the existing Active dataset and make the Pending dataset as the new active dataset. At 411, network processor 121 receives a pending dataset from router 102. At 412, network processor 121 stores the pending dataset in RAM 123 of network processor 121. At 413, network processor 121 sends the received pending dataset to host processor 132 to be stored in secure storage memory 131. At 414, host processor 132 stores the pending dataset into secure storage memory 131, which can further include encryption.

Operations at 401-406 are for an active dataset. Operations at 411-414 are for a pending dataset. Both are part of operations 321 described for FIG. 3, and performed when network processor 121 is in forming/joining state 202. Operations 421-425 are for operations 327 performed when network processor 121 is in reset state 209.

At 421, network processor 121 initiates a reset. At 422, network processor 121 sends and host processor 132 receives a request for the first dataset, e.g., an active dataset or a pending dataset. At 423, host processor 132 operates network interface driver 136 to read the first dataset from secure storage memory 131. At 424, host processor 132 sends the first dataset to network processor 121. Network processor 121 can further store the copy of the first dataset in the RAM 123 to become the second dataset. At 425, network processor 121 performs operations to reconnect to router 102 based on the second dataset.

Figure 5:
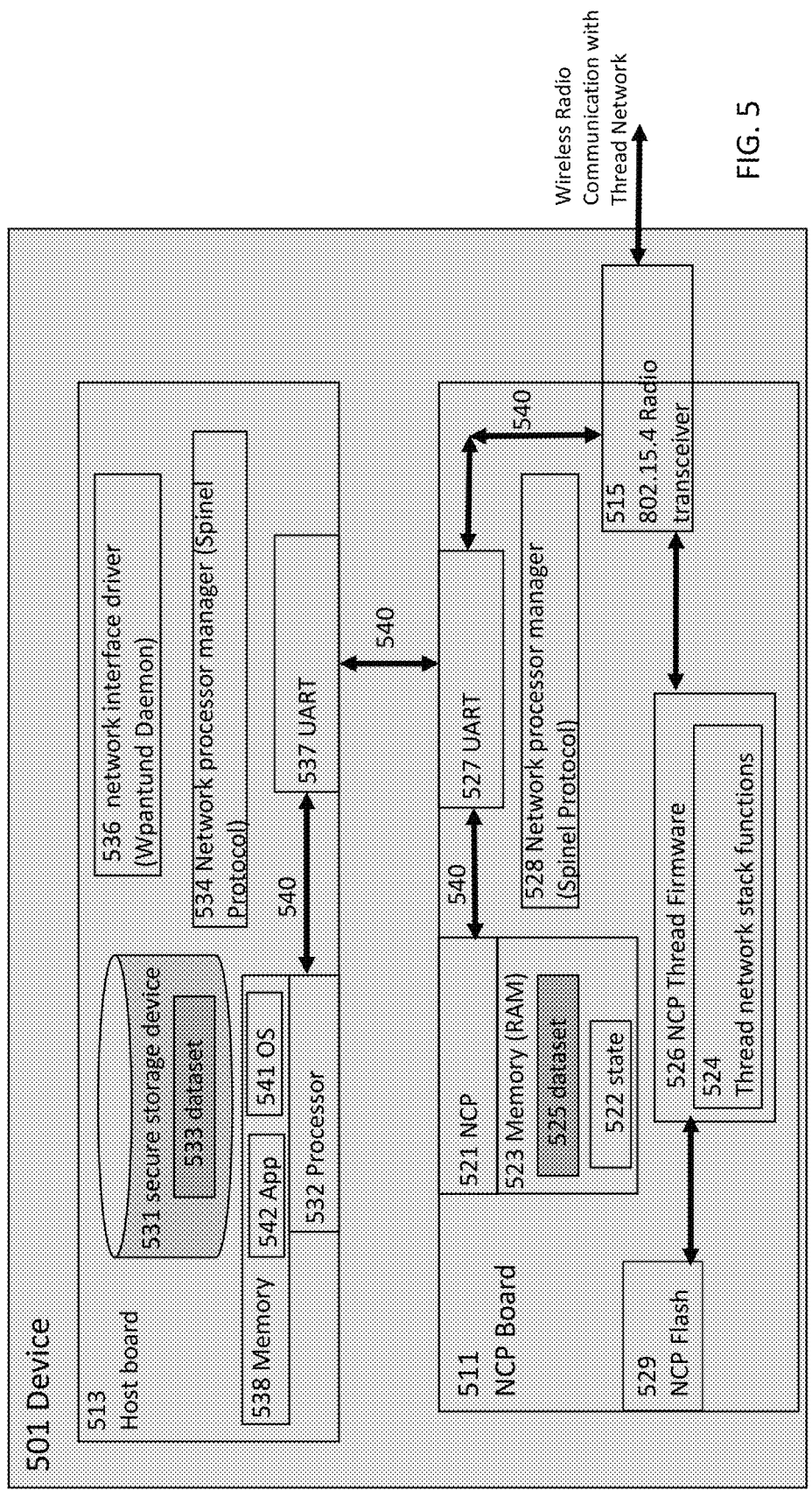
FIG. 5 illustrates an example implementation of a device of a thread network, according to some aspects of the disclosure.

FIG. 5 illustrates an example implementation of a device 501 of a thread network, according to some aspects of the disclosure. Device 501 can be an example of device 101 as shown in FIGS. 1A-1B.

According to some aspects, device 501 includes a transceiver 515 configured to wirelessly communicate with one or more devices of thread network 100. Transceiver 515 can be, for example, an IEEE 802.15.4 radio transceiver. Device 501 further includes a network processor board 511 communicatively coupled to transceiver 515, and a host processor board 513 communicatively coupled to transceiver 515 and network processor board 511. Both network processor board 511 and host processor board 513 can be a printed circuit board (PCB) including various components.

According to some aspects, host processor board 513 can include a secure storage memory 531 and a host processor 532. Secure storage memory 531 can be a persistent or nonvolatile storage memory. Secure storage memory 531 can store a dataset 533 comprising thread network parameters for the network processor to manage the network functions. Dataset 533 can contain security sensitive information. Host processor 532 can operate a network interface driver 536, e.g., wpantund Daemon, and a network processor manager 534, e.g., spinel protocol. In addition, host processor board 513 can include a memory 538, and a universal asynchronous receiver/transmitter (UART) 537 to be coupled to network processor board 511. Memory 538 can store an application 542 and an operating system 541.

According to some aspects, network processor board 511 includes a network processor 521, a volatile storage memory 523, e.g., memory, coupled to network processor 521, and a persistent or nonvolatile storage memory 529. Volatile storage memory 523 can store a dataset 525, and a set of states 522 for network processor 521. Dataset 525 can have a same content as dataset 533 stored in secure storage memory 531. In addition, persistent or nonvolatile storage memory 529 can store some other data, e.g., less security sensitive data. Further, network processor 521 can be configured to operate a thread firmware 526 to perform various network functions 524. Network processor 521 can operate in a state selected from the set of states 522 to manage network functions 524 for device 501 associated with thread network 100. Network processor board 511 can further include a network processor manager 528, e.g., spinel protocol, and a UART 527 to be coupled to host processor board 513.

The components shown in FIG. 5 for device 501 are only for example, and are not meant to be limiting. Additional components can include: a digital signal processor (DSP), one or more processor cores, a multiple-core processor, an application-specific integrated circuit (ASIC), or any other suitable multi-purpose or specific processor or controller.

According to some aspects, operations illustrated in FIG. 1B, FIG. 3, FIG. 4 performed at various states shown in FIG. 2 can be implemented by network processor 521 and host processor 532 executing instructions stored in memory 538 and memory 523 to perform the functionality described herein. Alternatively, such operations can be at least partially implemented on a separate processor or state-machine (not shown) that is "hard-wired" to implement various functions described herein. Additionally, host processor 532 and network processor 521 can be hard-wired to perform the functionality described herein.

Memory 538 and memory 523 may include random access memory (RAM) and/or cache, and may include control logic (e.g., computer software) and/or data. Memory 538 and memory 523 may include other storage devices or memory such as, but not limited to, a hard disk drive and/or a removable storage device/unit. According to some examples, operating system 541 can be stored in memory 538. Operating system 541 can manage transfer of data from memory 538 and/or one or more applications, e.g., network interface driver 536, network processor manager 534, to host processor 532, network processor 521, and/or one or more transceivers 515. In some examples, operating system 541 maintains one or more network protocol stacks (e.g., Internet protocol stack, cellular protocol stack, and the like) that can include a number of logical layers. At corresponding layers of the protocol stack, operating system 541 includes control mechanism and data structures to perform the functions associated with that layer.

According to some examples, application 542 can be stored in memory 538. Application 542 can include applications (e.g., user applications) used by thread device 501. Application 542 can include applications such as, but not limited to, Siri™, FaceTime™, radio streaming, video streaming, remote control, and/or other user applications.

Device 501 can also include communication infrastructure 540. Communication infrastructure 540 provides communication between, for example, host processor 532, network processor 521, one or more transceivers 515, and memory 538 and memory 523. In some implementations, communication infrastructure 540 may be a bus. Host processor 532, network processor 521, together with instructions stored in memory 538 and memory 523 perform operations enabling device 501 to implement mechanisms for a thread device, as described herein for device 101 as shown in FIGS. 1A-1B, the method 300 shown in FIG. 3, or the method 400 as shown in FIG. 4.

One or more transceivers 515 transmit and receive communications signals that support mechanisms for a thread device, as described herein for device 101 as shown in FIGS. 1A-1B, the method 300 shown in FIG. 3, or the method 400 as shown in FIG. 4. According to some aspects, one or more transceivers 515 may be coupled to an antenna. The Antenna may include one or more antennas that may be the same or different types. One or more transceivers 515 allow device 501 to communicate with other devices that may be wired and/or wireless. In some examples, one or more transceivers 515 can include processors, controllers, radios, sockets, plugs, buffers, and like circuits/devices used for connecting to and communication on networks. According to some examples, one or more transceivers 515 include one or more circuits to connect to and communicate on wired and/or wireless networks.

According to some aspects of this disclosure, one or more transceivers 515 can include a cellular subsystem, a WLAN subsystem, and/or a Bluetooth™ subsystem, each including its own radio transceiver and protocol(s) as will be understood by those skilled arts based on the discussion provided herein. In some implementations, one or more transceivers 515 can include more or fewer systems for communicating with other devices.

In some examples, one or more transceivers 515 can include one or more circuits (including a WLAN transceiver) to enable connection(s) and communication over WLAN networks such as, but not limited to, networks based on standards described in IEEE 802.11.

Additionally, or alternatively, one or more transceivers 515 can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, one or more transceivers transceiver 620 can include a Bluetooth™ transceiver.

Additionally, one or more transceivers 515 can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), and the like. For example, one or more transceivers 220 can be configured to operate according to one or more of Rel-15, Rel-16, Rel-17, or later of 3GPP standard.

According to some aspects of this disclosure, host processor 532, network processor 521, alone or in combination with computer instructions stored within memory 538 and memory 523, and/or one or more transceiver 515, implements the methods and mechanisms discussed in this disclosure.

Figure 6:
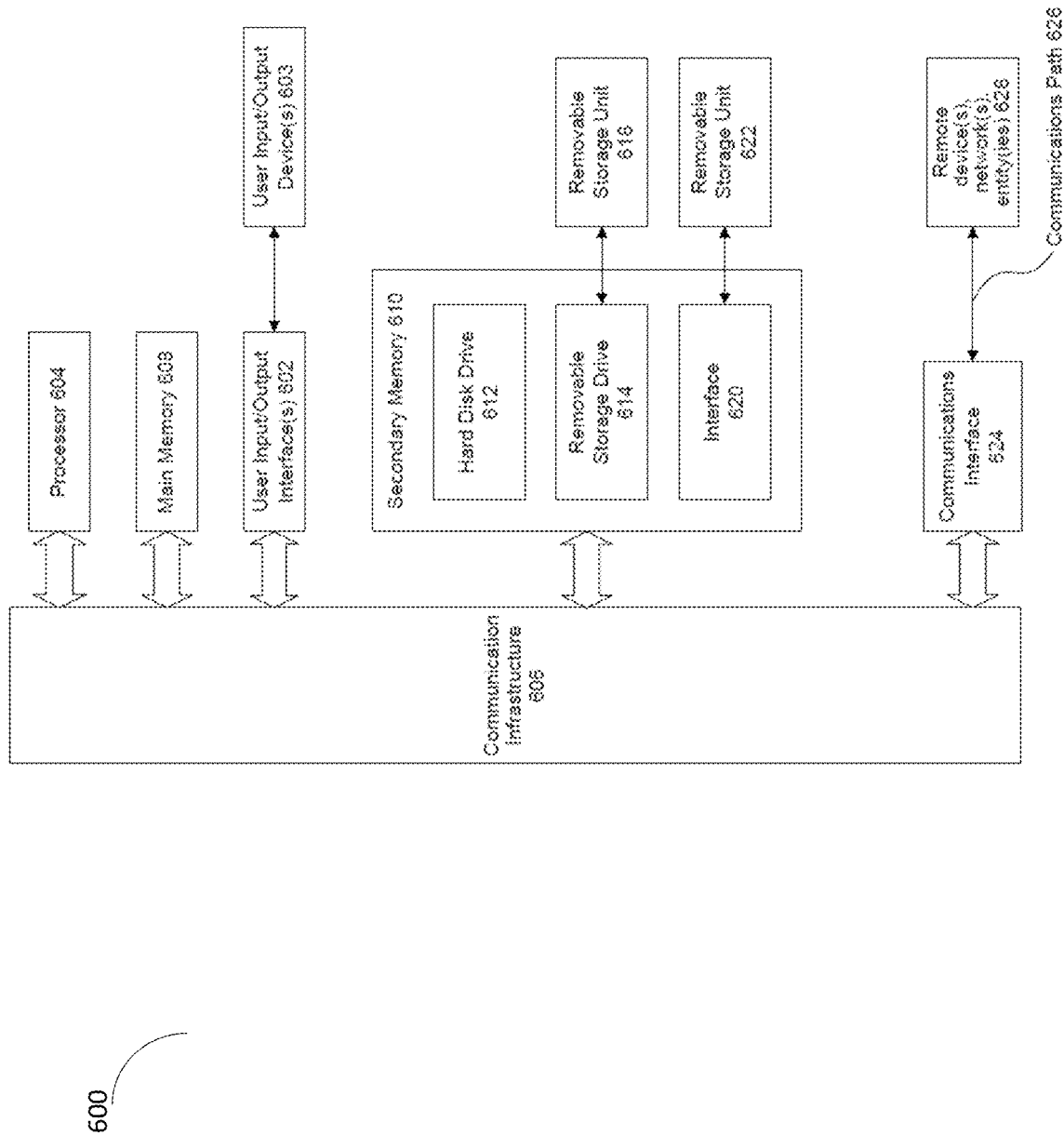
FIG. 6 is an example computer system for implementing some aspects or portion(s) thereof of the disclosure provided herein.

Various aspects can be implemented, for example, using one or more computer systems, such as computer system 600 shown in FIG. 6. Computer system 600 can be any computer capable of performing the functions described herein such as the wireless devices 101-107 as shown in FIG. 1A, or device 501 of FIG. 5. Computer system 600 includes one or more processors (also called central processing units, or CPUs), such as a processor 604. Processor 604 is connected to a communication infrastructure 606 (e.g., a bus). Computer system 600 also includes user input/output device(s) 603, such as monitors, keyboards, pointing devices, etc., that communicate with communication infrastructure 606 through user input/output interface(s) 602. Computer system 600 also includes a main or primary memory 608, such as random access memory (RAM). Main memory 608 may include one or more levels of cache. Main memory 608 has stored therein control logic (e.g., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to some aspects, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

In some examples, main memory 608, the removable storage unit 618, the removable storage unit 622 can store instructions that, when executed by processor 604, cause processor 604 to perform operations for a wireless device, e.g., the wireless devices 101-107 as shown in FIG. 1A, or device 501 of FIG. 5. In some examples, the operations include those operations illustrated and described in FIGS. 1B, and 3-4.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626. Operations of the communication interface 624 can be performed by a wireless controller, and/or a cellular controller. The cellular controller can be a separate controller to manage communications according to a different wireless communication technology. The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 600, main memory 608, secondary memory 610 and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 6. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

For one or more embodiments or examples, at least one of the components set forth in one or more of the preceding figures may be configured to perform one or more operations, techniques, processes, and/or methods as set forth in the example section below. For example, circuitry associated with a thread device, routers, network element, etc. as described above in connection with one or more of the preceding figures may be configured to operate in accordance with one or more of the examples set forth below in the example section.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A thread network apparatus, comprising:
   a transceiver configured to transmit and receive communication signals over a thread network;
   a network processor communicatively coupled to the transceiver, and configured to operate in a state selected from a set of states to manage network functions associated with the thread network;
   a first memory that stores a first dataset comprising thread network parameters associated with the network functions, wherein the first memory is a nonvolatile memory with a first level of security protection,
   wherein the network processor is further configured to manage the network functions based on a second dataset stored in a second memory with a second level of security protection that is less than the first level of security protection, and wherein the second dataset has a same content as the first dataset; and
   a host processor communicatively coupled to the network processor and the first memory, wherein the host processor is configured to:
      store the first dataset in the first memory;
      delete the first dataset from the first memory; or
      read the first dataset from the first memory.

2. The thread network apparatus of claim 1, wherein the network functions managed by the network processor include network functions above a Medium Access Control (MAC) layer function and below an application layer function in a communication protocol stack associated with the thread network.

3. The thread network apparatus of claim 1, wherein the set of states the network processor operates includes a waiting state, a forming a network state, a joining state, an update state, a leaving state, a reset state, an associated state, and a start state.

4. The thread network apparatus of claim 1, wherein the network processor is communicatively coupled to the second memory that stores the second dataset, and the second memory is a volatile memory.

5. The thread network apparatus of claim 4, wherein the network processor is further configured to:
   receive a dataset from the thread network or from the host processor;
   store the received dataset in the second memory as the second dataset;
   send the received dataset from the thread network to the host processor;
   receive one or more instructions from the host processor to perform operations associated with the thread network;
   perform a reset operation of the network processor;
   send a request to the host processor for the first dataset stored in the first memory; or
   detect a state among the set of states the network processor operates.

6. The thread network apparatus of claim 4, wherein the host processor is further configured to:
   send the first dataset stored in the first memory to the network processor;
   receive a dataset from the network processor and store the received dataset in the first memory to become the first dataset;
   instruct the network processor to perform an operation to Join, Leave, or Form the thread network;
   inquire the state of the network processor; or
   perform a reset operation of the network processor.

7. The thread network apparatus of claim 4, wherein the network processor is in an update state and configured to:
   receive, from one or more devices of the thread network, an updated dataset that contains updated information for the second dataset stored in the second memory;

store the updated dataset in the second memory; and
send, to the host processor, the updated dataset; and
wherein the host processor is configured to:
receive the updated dataset from the network processor;
store the updated dataset in the first memory; and
delete the first dataset already stored in the first memory.

8. The thread network apparatus of claim 4, wherein the network processor is in a forming a network state or a joining state, and wherein the host processor is configured to:
delete the first dataset from the first memory; and
instruct the network processor to perform operations to Join or Form the thread network; and
the network processor is configured to:
join or form the thread network;
receive a dataset from a leader or from a router of the thread network;
store the received dataset in the second memory to be the second dataset; and
send the received dataset to the host processor to be stored in the first memory.

9. The thread network apparatus of claim 4, wherein the network processor is in a leaving state, and wherein the host processor is configured to:
delete the first dataset from the first memory; and
instruct the network processor to perform operations to leave the thread network; and
the network processor is configured to:
perform operations to leave the thread network.

10. The thread network apparatus of claim 4, wherein the network processor is in a reset state, and wherein the host processor is configured to:
receive a request from the network processor for the first dataset;
read the first dataset from the first memory; and
send the first dataset to the network processor; and
the network processor is configured to:
send the request to the host processor for the first dataset;
receive a copy of the first dataset from the host processor;
store the copy of the first dataset in the second memory to become the second dataset; and
perform operations to reset the network processor.

11. The thread network apparatus of claim 4, wherein the host processor is configured to:
perform a reset operation of the network processor; and
receive a copy of the second dataset from the network processor, based on the network processor being in an associated state that indicates there is a connection between the network processor and the thread network; or
read the first dataset from the first memory, and send the first dataset to the network processor, based on the network processor not being in the associated state.

12. The thread network apparatus of claim 1, wherein the first dataset includes an active operational dataset, a pending operational dataset, an active timestamp, a pending timestamp, a master key, a network name, a personal area network ID (PANID), an extended personal area network ID (XPANID), a mesh local prefix, a delay, a channel, a portable symmetric key container (PSKC), a security policy, or a channel mask.

13. The thread network apparatus of claim 1, further comprising a third memory that is a nonvolatile memory coupled to the network processor, wherein the third memory stores data about a role, a device mode, a routing locator (RLOC), a key sequence number, a mesh link establishment (MLE) frame counter, a Medium Access Control (MAC) frame counter, a previous partition ID, an extended address, a default interface identifier (IID), a mesh-local endpoint identifier (ML-EID), a stateless address autoconfiguration (SLAAC) default interface identifier (IID), a secret key, a child information, a parent information, or a network information.

14. The thread network apparatus of claim 1, wherein the thread network apparatus is a router, an end device, a router eligible end device, a full end device, a minimal end device, a minimal thread device, a sleepy end device, a leader, or a border router.

15. A thread network apparatus, comprising:
a transceiver configured to transmit and receive communications over a thread network;
a first memory that stores a first dataset comprising thread network parameters for managing network functions associated with the thread network, wherein the first memory is a nonvolatile memory with a first level of security protection, wherein the first level of security protection is higher than a second level of security protection used to protect a second memory storing a second dataset having a same content as the first dataset; and
a host processor communicatively coupled to the first memory, wherein the host processor is configured to:
store the first dataset in the first memory;
delete the first dataset from the first memory;
read the first dataset from the first memory;
send the first dataset to a network processor after reading the first dataset from the first memory;
receive a dataset from the network processor and store the received dataset in the first memory to become the first dataset; or
instruct the network processor to perform an operation to Join, Leave, or Form the thread network.

16. The thread network apparatus of claim 15, wherein the thread network is identified by a 2-byte personal area network ID (PAN ID), an 8-byte extended personal area network ID (XPAN ID), or a network name.

17. The thread network apparatus of claim 15, further comprising:
the network processor communicatively coupled to the transceiver and the host processor, and configured to operate in a state selected from a set of states to manage the network functions associated with the thread network; and
the second memory that stores the second dataset, wherein the second memory is a volatile memory and wherein the network processor is configured to manage the network functions based on the second dataset;
wherein the network functions managed by the network processor include network functions above a Media Access Control (MAC) layer function and below an application layer function in a communication protocol stack, and wherein the MAC layer function includes a personal network MAC layer function, an IEEE 802.15.4 MAC layer function, a ZigBee MAC layer function, a Z-Wave MAC layer function, or a Bluetooth Low Energy (LE) MAC layer function.

18. A method for operating a device associated with a thread network, comprising:
storing, by a host processor, a first dataset in a first memory communicatively coupled to the host processor, wherein the first memory is a nonvolatile memory with a first level of security protection;
reading, by the host processor, the first dataset from the first memory;

sending, by the host processor, the first dataset to a network processor communicatively coupled to the host processor;

saving, by the network processor, the first dataset into a second memory coupled to the network processor to become a second dataset, wherein the second dataset has a same content as the first dataset, the second memory is a volatile memory with a second level of security protection, and wherein the second level of security protection is less than the first level of security protection;

operating, by the network processor, in a state selected from a set of states to manage network functions associated with the thread network based on the second dataset, wherein the second memory is a volatile memory; and instructing, by the host processor, the network processor to perform an operation to Join, Leave, or Form the thread network.

19. The method of claim 18, further comprising:

inquiring, by the host processor, the state of the network processor, wherein the state of the network processor is an associated state indicative of a connection between the network processor and the thread network; and receiving, by the host processor, a copy of the second dataset from the network processor.

20. The method of claim 18, wherein the first dataset includes an active operational dataset, a pending operational dataset, an active timestamp, a pending timestamp, a master key, a network name, a personal area network ID (PANID), an extended personal area network ID (XPANID), a mesh local prefix, a delay, a channel, a portable symmetric key container (PSKC), a security policy, or a channel mask.

* * * * *